(12) United States Patent
Hwang et al.

(10) Patent No.: US 6,548,917 B2
(45) Date of Patent: Apr. 15, 2003

(54) PLANAR MOTOR

(75) Inventors: Ji Hyun Hwang, Kyungki-do (KR); Do Hyun Kim, Kyoungki-do (KR); Jang Sung Chun, Seoul (KR); Hyun Kyo Jung, Kyungki-do (KR)

(73) Assignee: Mirae Corporation, Choongchungnam-Do (KR)

(*) Notice: Subject to any disclaimer, the term of this patent is extended or adjusted under 35 U.S.C. 154(b) by 54 days.

(21) Appl. No.: 09/780,378

(22) Filed: Feb. 12, 2001

(65) Prior Publication Data
US 2001/0043017 A1 Nov. 22, 2001

(30) Foreign Application Priority Data

| May 20, 2000 | (KR) | 2000-27231 |
| May 20, 2000 | (KR) | 2000-27232 |
| May 20, 2000 | (KR) | 2000-27233 |

(51) Int. Cl.$^7$ ............................................... H02K 41/00
(52) U.S. Cl. .................................. 310/12; 74/471 XY
(58) Field of Search ........................... 310/12, 13, 14; 33/1 M; 74/471 XY; 108/137, 138; 29/721, 760, 785; 355/53, 72

(56) References Cited

U.S. PATENT DOCUMENTS 6,005,309 A    12/1999 Chitayat .................... 310/12
6,069,418 A *  5/2000  Tanaka ...................... 310/12
6,188,147 B1 * 2/2001  Hazelton et al. ............ 310/12
6,257,512 B1 * 7/2001  Schoeck et al. ........... 242/170

FOREIGN PATENT DOCUMENTS

JP    402309536 A    * 12/1990

* cited by examiner

Primary Examiner—Nestor Ramirez
Assistant Examiner—Judson H. Jones
(74) Attorney, Agent, or Firm—Fleshner & Kim, LLP

(57) ABSTRACT

A planar motor moved in the X-Y direction on a plane includes a mover having an armature coil part installed at the bottom of an armature frame, for receiving an electric signal, and a stator with a first permanent magnet part installed having S-pole permanent magnets and N-pole permanent magnets arranged in a manner that a corner of the N-pole permanent magnets contacts four corners of the S-pole permanent magnets on the surface of a stator frame installed facing the armature coil part of the mover, and inserted permanent magnets arranged at spaces formed as the corners of the S-pole permanent magnets contact the corners of N-pole permanent magnets. Since the inserted permanent magnets are arranged at the first or the second permanent magnet part, the packing density of the permanent magnets can be increased, and accordingly, as the leakage flux is reduced, more stronger thrust can be attained.

23 Claims, 6 Drawing Sheets

PLANAR MOTOR

BACKGROUND OF THE INVENTION

1. Field of the Invention

The present invention relates a planar motor, and more particularly to a planar motor having a stator and a mover in which permanent magnets are arranged to reduce a leakage magnetic flux, thereby increasing a magnetic flux density and generating a strong thrust.

2. Description of the Background Art

A planar motor is constructed such that a mover is moved on a plane while separated a predetermined height above or distance apart from a surface of a stator. The planar motion of the mover may be adopted to drive a head unit for mounting components on a printed circuit board in the X-Y direction in a component mounting device. In this case, in order to generate a driving force to move the head unit in the X-Y direction, the planar motor needs to have a strong thrust.

Figure 1:
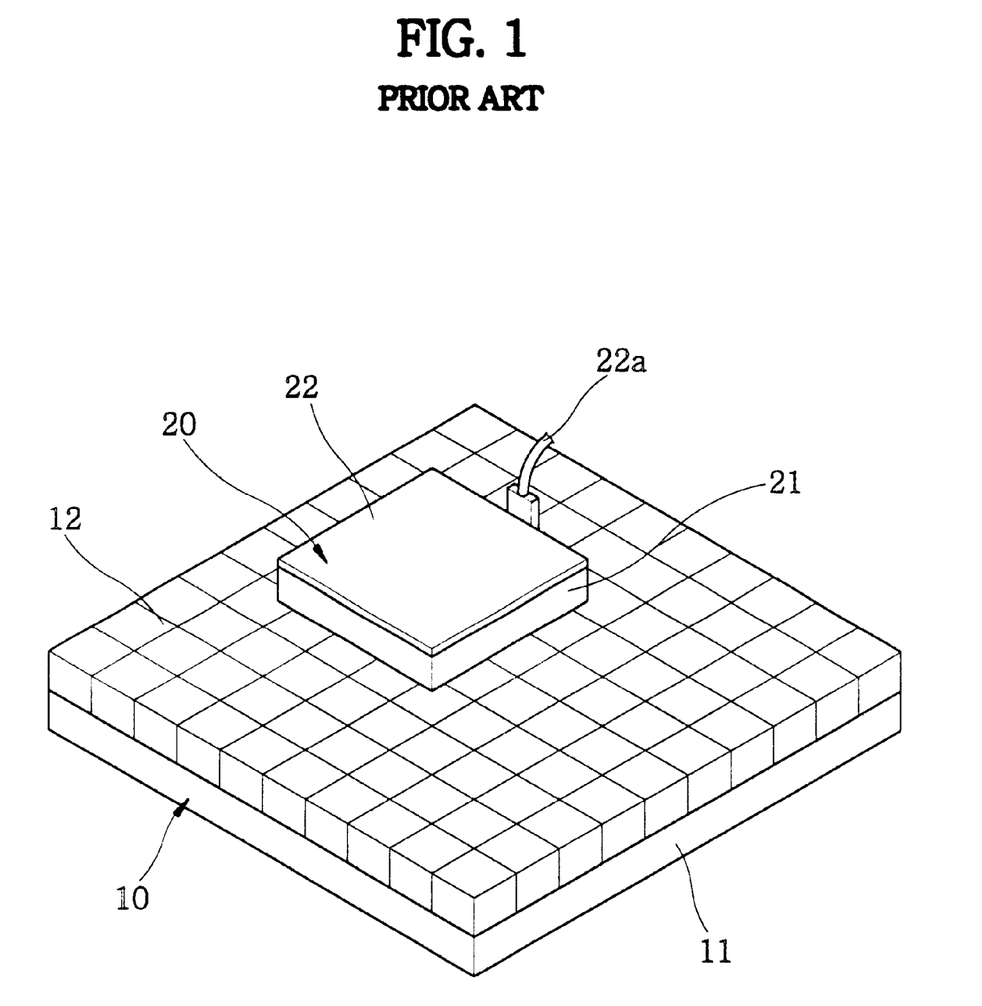
FIG. 1 is a perspective view of a planar motor in accordance with a conventional art.
Figure 2A:
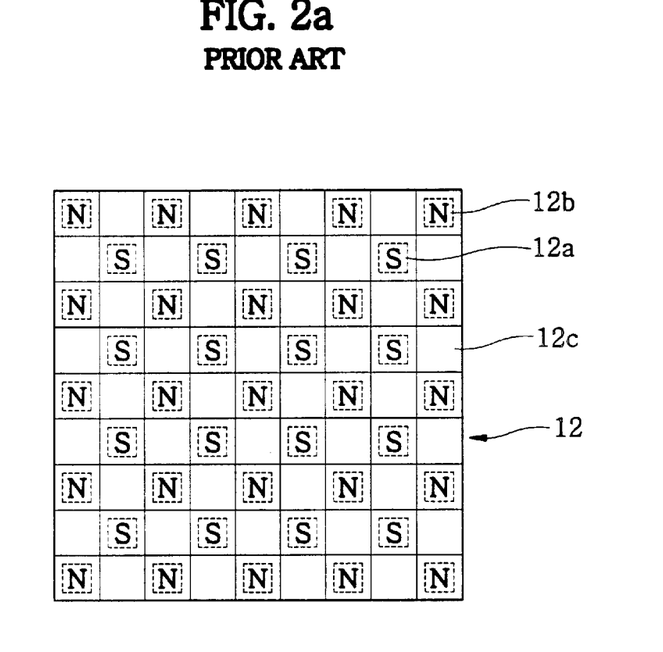
FIGS. 2A and 2B are plan views of a permanent magnet part formed on the plane of a stator of FIG. 1 in accordance with the conventional art.
Figure 2B:
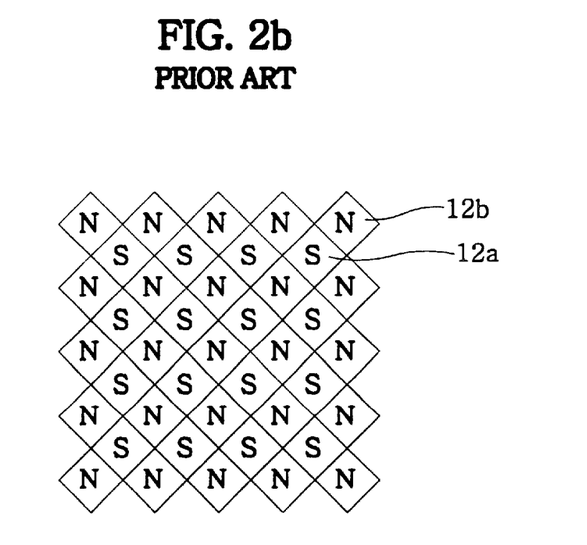

FIG. 1 is a perspective view of a planar motor in accordance with a conventional art, and FIGS. 2A and 2B are plan views of a permanent magnet part arranged on a plane surface of the stator of FIG. 1.

As shown in FIG. 1, the planar motor includes a stator 10 and a mover 20. The stator 10 includes a permanent magnet part 12 having a plurality of S-pole permanent magnets 12a and a plurality of N-pole permanent magnets 12b arranged in a grid form on the plane surface of the stator frame 11. The mover 20 includes an armature coil part 21 at the bottom surface of an armature frame 22.

In order for the armature coil part 21 to receive an electric signal, there is provided a cable 22a at one side of the mover 20. When the electric signal is applied to the cable 22a, a thrust is generated between the armature coil part 21 of the mover 20 and the permanent magnet part 12 of the stator 10.

In order to move the mover 20 in the X-Y direction on the plane of the stator by virtue of the thrust generated between the permanent magnet part 12 and the armature coil part 21, the mover 20 needs to be lifted up a predetermined height from the plane surface of the stator 10.

In order to lift up the mover 20 from the plane surface of the stator at a predetermined height, a nozzle (not shown) is installed at the mover 20.

When air is jetted through the nozzle, the mover 20 is lifted up a predetermined height from the surface of the stator 10 by virtue of the air-jetting force, and in this state, the mover 20 moves freely on the plane of the stator 10.

In order to move the mover 20 in the X-Y direction on the plane of the stator 10, as shown in FIG. 2A, the permanent magnet part 12 corresponding to the armature coil part 21 installed at the mover 20 includes a plurality of S-pole permanent magnets 12a and a plurality of N-pole permanent magnets 12b formed in a grid form on the plane of the stator frame 11.

In detail, the permanent magnet part 12 is formed in a manner that, centering around the S-pole permanent magnet 12a, a respective corner of each of a plurality of the N-pole permanent magnets 12b contacts respectively each corner of the S-pole permanent magnet 12a, or conversely, centering around the N-pole permanent magnet 12b, a respective corner of each of a plurality of the S-pole permanent magnets 12a contacts respectively each corner of the N-pole permanent magnet 12b, whereby a grid is formed.

The permanent magnet part 12, having the plurality of S-pole permanent magnets 12a and the plurality of N-pole permanent magnets 12b arranged such that each corner of each permanent magnet contacts a corner of another permanent magnet, includes quadrangular space 12c formed between the S-pole permanent magnets 12a and the N-pole permanent magnets 12b, as shown in FIG. 2A. Because of this space 12c, the packing density of the permanent magnets is low on the whole permanent magnet part 12, causing a problem that the thrust of the planar motor becomes weak.

Thus, in order to improve the low packing density of the permanent magnet part 12, as shown in FIG. 2A, the S-pole permanent magnets 12a and the N-pole permanent magnets 12b of the permanent magnet part 12 are arranged to be inclined at a predetermined angle such that each of a plurality of the N-pole permanent magnets 12b contacts a side of the four sides of a plurality of the S-pole permanent magnets 12a or each of a plurality of the S-pole permanent magnets 12a contacts a side of the four sides of a plurality of the N-pole permanent magnets 12b, as shown in FIG. 2B.

As the S-pole permanent magnets 12a and the N-pole permanent magnets 12b are arranged to contact with each other as shown in FIG. 2B, the packing density of the permanent magnet part of FIG. 2B is enhanced compared to the permanent magnet part of FIG. 2A.

In this case, however, since the S-pole permanent magnets 12a and the N-pole permanent magnets 12b are so closely arranged and polarized, the number of magnetic flux interlinkage lines interlinked with current flowing along the armature coil part 21 is reduced, so that leakage current is generated.

In addition, since the length of magnetization formed by the S-pole permanent magnets 12a and the N-pole permanent magnets 12b is shortened, the strength of the permanent magnets is reduced, resulting in that the overall thrust of the planar motor is weakened.

SUMMARY OF THE INVENTION

Therefore, an object of the present invention is to provide a planar motor which is capable of reduce a leakage magnetic flux by increasing packing density of S-pole permanent magnets and N-pole permanent magnets arranged on a plane of a stator frame as well as increasing the number of magnetic flux interlinkage lines interlinked with current flowing along an armature coil part installed at a mover frame and capable of increasing the intensity of magnet by increasing the length of magnetization.

Another object of the present invention is to provide a planar motor which is capable of reducing a leakage magnetic flux by increasing the number of magnetic flux interlinkage lines and capable of generating stronger thrust by increasing the length of magnetization and the intensity of magnet.

To achieve these and other advantages and in accordance with the purpose of the present invention, as embodied and broadly described herein, there is provided a planar motor including: a mover having an armature coil part installed at the bottom of an armature frame for receiving an electric signal, and a stator with a first permanent magnet part installed having S-pole permanent magnets and N-pole permanent magnets arranged in a manner that one corner of each of the N-pole permanent magnets contacts one of each of the four corners of a respective one of the S-pole permanent magnets on the plane surface of a stator frame installed facing the armature coil part of the mover, and inserted permanent magnets arranged at spaces formed as the corners of the S-pole permanent magnets contact the corners of N-pole permanent magnets.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3A:
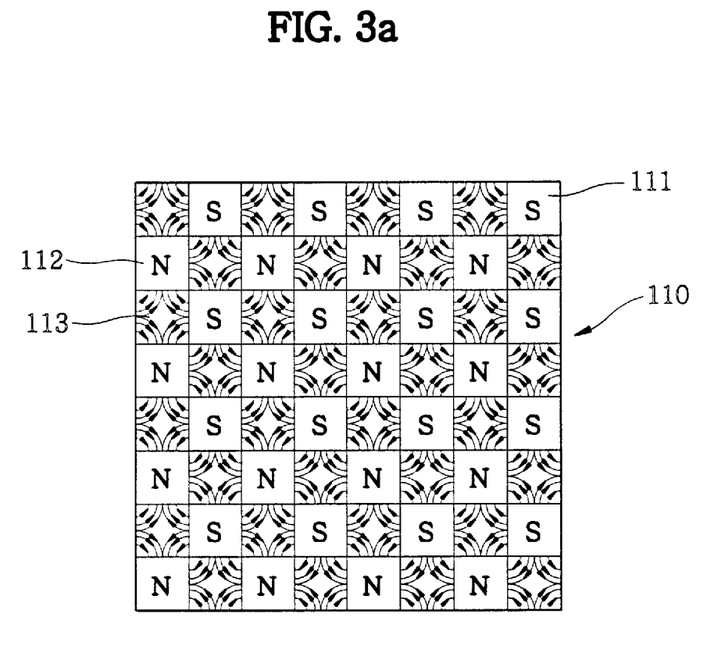
FIGS. 3A through 3C are plan view of a first permanent magnet part formed on the plane of a stator in accordance with a first embodiment of the present invention.
Figure 3B:
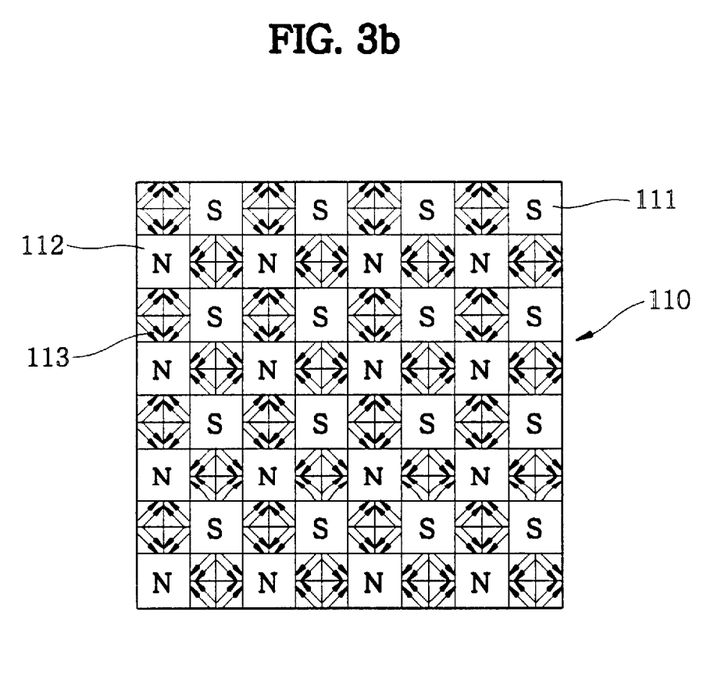
Figure 3C:
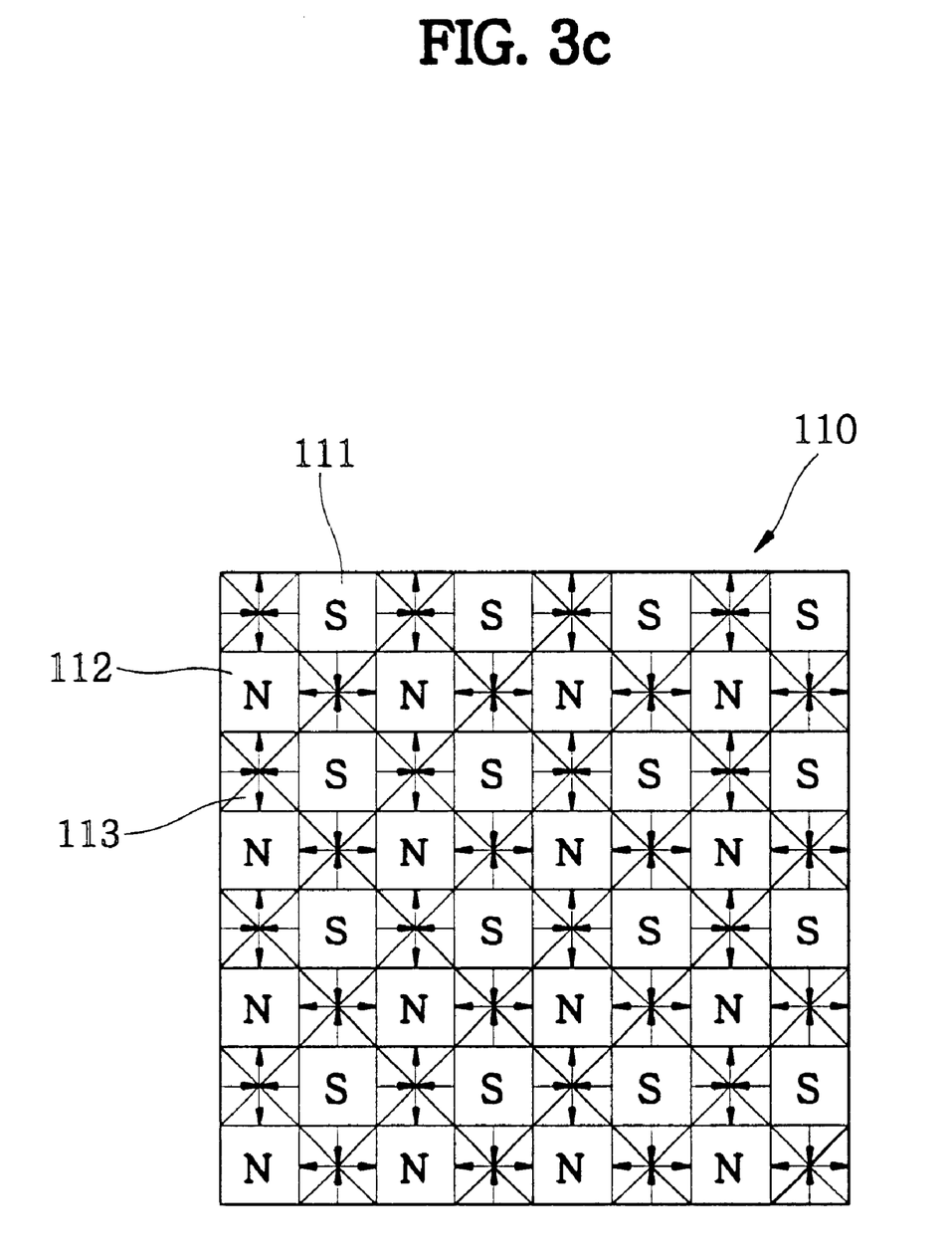

FIGS. 3A through 3C are plan view of a first permanent magnet part formed on the plane of a stator in accordance with a first embodiment of the present invention.

As shown in the drawing, a planar motor includes a mover 20 (refer to FIG. 1) consisting of an armature frame 22 and an armature coil part 21 installed at the bottom of the armature frame 22 for receiving an electric signal, and a stator consisting of a stator frame 11 (refer to FIG. 1) installed facing the armature coil part 21 of the mover 20 and a first permanent magnet part 110 installed on the surface of the stator frame 11, the first permanent magnet part 110 having N-pole permanent magnets 112 and S-pole permanent magnets 111 arranged in a manner that one corner of N-pole permanent magnets 112 contact four corners of the S-pole permanent magnets 111 and inserted permanent magnets 113 are arranged at spaces formed as the corners of S-pole permanent magnets 111 and the corners of the N-pole permanent magnets 112 contact with each other.

The construction and operation of the planar motor of the present invention will now be described in detail.

As shown in FIG. 1, the planar motor includes the stator 10 and the mover 20. The stator 10 has a plane form, and the mover 20 is moved on the plane of the stator 10 in the X-Y direction. The mover 20 which moves on the plane of the stator 10 includes a cable 22a for transmitting an electric signal received from an external source to the armature coil part 21. The armature coil part 21 which receives the electric signal through the cable 22a is installed at the lower surface of the armature frame 22.

The armature coil part 21 installed at the bottom surface of the armature frame 22 includes a plurality of armature coils (not shown), and the armature coils are arranged in a manner that the mover 20 can change its direction perpendicular to move X-axis or Y-axis direction on the plane of the stator 10.

In order for the mover 20 to change its direction perpendicular by virtue of the plurality of armature coils in moving on the stator 10, the move 20 has a nozzle (not shown). The nozzle sprays air, forming air bearing, to lift the mover 20 from the plane surface of the stator 10 to a predetermined height when the mover 20 moves on the stator 10.

Thanks to the air bearing, the mover 20 is lifted up to a predetermined height from the plane surface of the stator 10, and at this state, the mover 20 can move freely on the plane of the stator 10 in the X or Y direction without friction.

In order to move the mover 20 in the X-Y direction, a first permanent magnet part 110 is installed at the stator frame provided at the stator 10.

As shown in FIG. 3A, the first permanent magnet part 110, having a plurality of S-pole permanent magnets and a plurality of N-pole permanent magnets, is formed on the surface of the stator frame 11 installed to face the armature coil part 21 of the mover 20 the plurality of S-pole permanent magnets and the plurality of N-pole permanent magnets are arranged in a manner that one corner of the N-pole permanent magnet 112 contacts each corner of the S-pole permanent magnet 11.

That is, one corner of the N-pole permanent magnet 112 having the same square shape as that of the S-pole permanent magnet 111 contacts the four corners of the square-shaped S-pole permanent magnet 111, so as to be polarized.

In the first permanent magnet part 110, the S-pole permanent magnets 111 and the N-pole permanent magnets are arranged in a manner that one corner of N-pole permanent magnets 112 contact the four corners of the S-pole permanent magnet 111, or conversely, one corner of the S-pole permanent magnets 111 contacts each corner of the N-pole permanent magnets 112, so as to be polarized.

At the spaces formed as each corner of the S-pole permanent magnets 111 and the N-pole permanent magnets 112 contacts each corner of the S-pole permanent magnets 111 and the N-pole permanent magnets 112 with different polarity, inserted permanent magnets 113 are arranged to be polarized. With this arrangement, the magnetization of the S-pole permanent magnets 111 and the N-pole permanent magnets 112 is lengthened in the direction of arrows as shown in FIG. 3A, according to which the number of the magnetic flux interlinkage lines interlinked with current flowing the armature coil part 21 is increased. Thus, since the strength of the magnet is increased as a whole, thereby improving the thrust of the planar motor.

As shown in FIG. 3A, the inserted permanent magnet 113 of the first permanent magnet part 110 can be polarized by one, or as shown in FIG. 3B, it may be diagonally divided into four sections to be polarized. Or, as shown in FIG. 3C, the inserted permanent magnet 113 may be divided into four sections in the horizontal and vertical directions to be polarized.

As shown in FIGS. 3B and 3C, by dividing the inserted permanent magnet 113 into four sections in the diagonal direction or in the horizontal and vertical direction, the magnetization length of the S-pole and N-pole permanent magnets 111 and 112 can be increased, and as the leakage flux is reduced, the strength of the magnet can be increased.

The arrow shown in FIGS. 3A through 3C means the direction of magnetization of the S-pole permanent magnets 111 and the N-pole permanent magnets 112 constructing the first permanent magnet part 113, from the S-pole permanent magnets 111 to the N-pole permanent magnets 112.

On the basis of this paper, the S-pole permanent magnet 111 means the direction of going to the paper, while the N-pole permanent magnet 112 means the direction of going out from the paper. The S-pole permanent magnet 111, the N-pole permanent magnet 112 and the inserted permanent magnet 113 are isotropically polarized.

Another embodiment of the first permanent magnet part 110 adopted to the planar motor will now be explained with reference to the accompany FIGS. 4A and 4B.

Figure 4A:
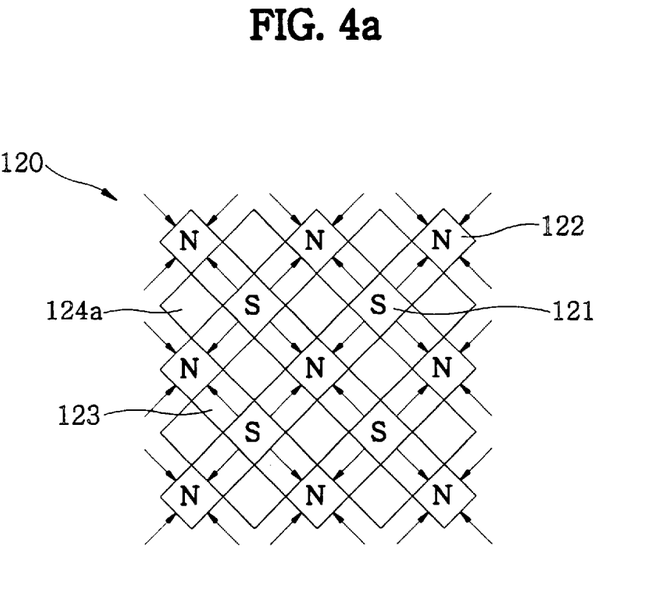
FIGS. 4A and 4B are plan views of a second permanent magnet part formed on the plane of a stator in accordance with a second embodiment of the present invention.
Figure 4B:
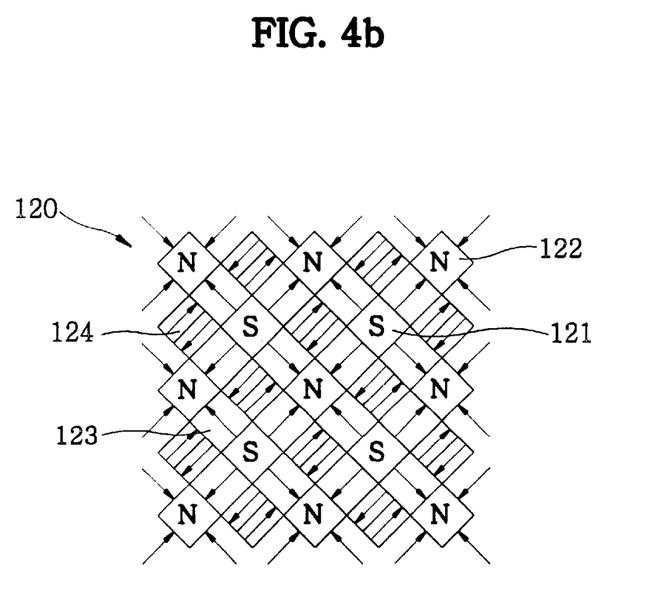

FIGS. 4A and 4B are plan views of a second permanent magnet part formed on the plane of a stator in accordance with a second embodiment of the present invention.

As shown in the drawings, a second permanent magnet part 120, having S-pole permanent magnets 121 and N-pole permanent magnets 122, is formed on the surface of the stator frame 11 installed facing the armature coil part 21 of the mover 20. The S-pole permanent magnets 121 are arranged to be inclined at a predetermined angle and N-pole permanent magnets 122 are arranged in a manner that one side thereof faces the S-pole permanent magnet 121 at an interval spaced apart as large as the S-pole permanent magnet 121.

Or, conversely, the N-pole permanent magnets 122 may be arranged to be inclined at a predetermined angle on the surface of the stator frame 11 and the S-pole permanent magnets 12 are arranged in a manner that one side thereof faces the N-pole permanent magnet 122 at an interval spaced apart as large as the N-pole permanent magnet 122.

With the S-pole permanent magnets 121 arranged to be inclined at a predetermined angle and the N-pole permanent magnets 122 arranged so as for one side thereof to face the S-pole permanent magnets 121 in four directions, so as to be polarized, a first inserted permanent magnets 123 are arranged at the spaces between the S-pole permanent magnets and the N-pole permanent magnets, and areas 124a are formed as each corner of the first inserted permanent magnets 123 contacts.

At the spaces 124a formed as each corner of the first inserted permanent magnets 123 of the second permanent magnet part 120 contacts each other, second inserted permanent magnets 124 are arranged as shown in FIG. 4B. The second inserted permanent magnets 124 are divided into two sections in parallel to the inclined direction of the S-pole permanent magnets or the N-pole permanent magnets 122 so as to be polarized.

The S-pole permanent magnets 121, the N-pole permanent magnets 122 and the first inserted permanent magnets 123 as well as the second inserted permanent magnets 124 as divided are polarized isotropically to be arranged in the same manner as that of the first permanent magnet part 110.

The arrows as shown in FIGS. 4A and 4B of the second permanent magnet part 120 polarized to have isotropy means the direction of magnetization from the S-pole permanent magnets 111 to the N-pole permanent magnets 112.

On the basis of a sheet of this paper, the S-pole permanent magnet 111 means the direction of going to the paper, while the N-pole permanent magnet 112 means the direction of going out from the paper.

Figure 5:
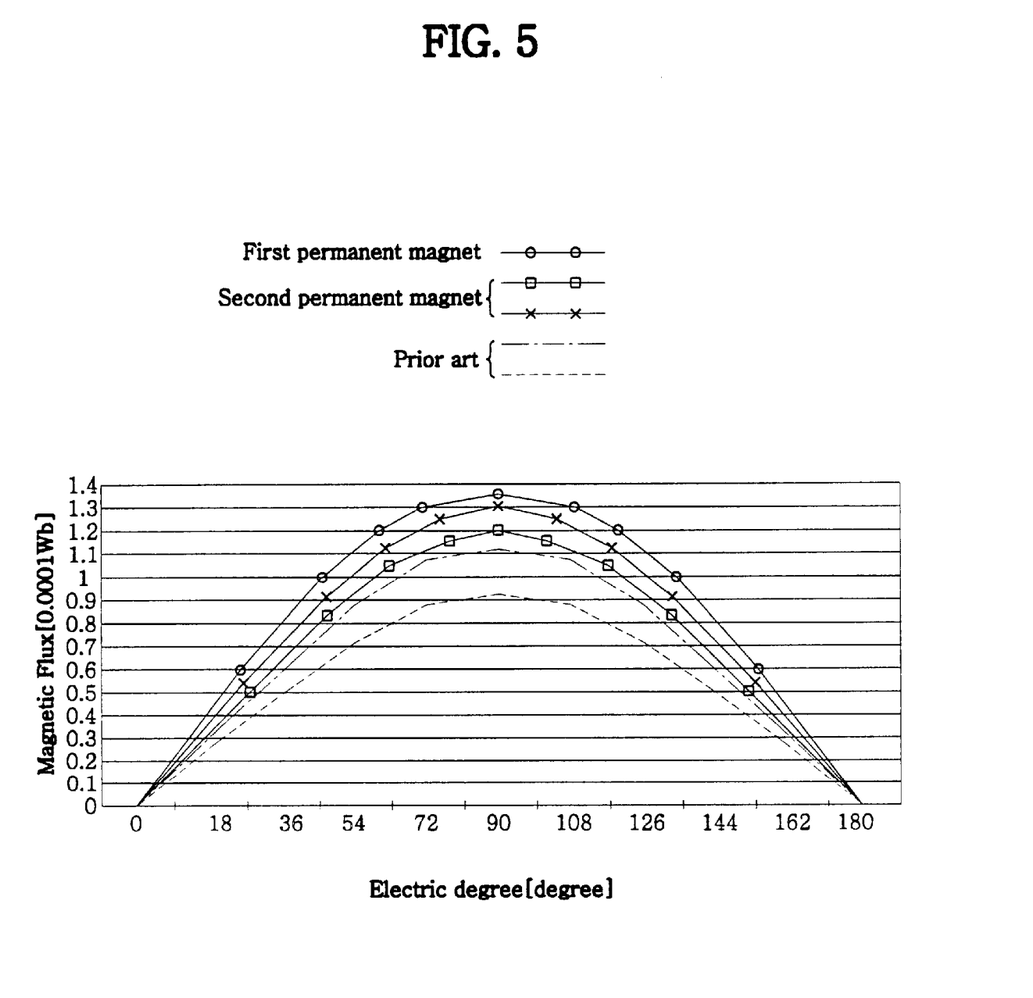
FIG. 5 is a graph showing a magnet flux amount of a planar motor according to arrangement of permanent magnet part in accordance with the present invention.

FIG. 5 is a graph of a magnet flux amount of a planar motor according to arrangement of permanent magnet part in accordance with the present invention, which comparatively shows the first permanent magnet part 110 as illustrated in FIGS. 3A through 3C and the second permanent magnet part 120 as illustrated in FIGS. 4A and 4B of the present invention and the conventional permanent magnet part 12 as illustrated in FIGS. 2A and 2B.

As noted in FIG. 5, by arranging the inserted permanent magnets 113 or the first and the second inserted permanent magnet parts 123 and 124 respectively at the first permanent magnet part 110 and the second permanent magnet part 120, the length of magnetization is increased, so that the strength of magnet greater than that of the conventional permanent magnet part 12 can be obtained, and thus, a planar motor having a stronger thrust in the same area of the permanent magnet can be obtained.

As so far described, according to the planar motor of the present invention, since the inserted permanent magnets are arranged and polarized at the first or the second permanent magnet part, the packing density of the permanent magnets can be increased, and accordingly, as the leakage flux is reduced, more stronger thrust can be attained.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A planar motor movable in the X-Y direction on a plane, comprising:
   a mover having an armature coil part installed at a bottom of an armature frame for receiving an electric signal; and
   a stator with a first permanent magnet part installed having S-pole permanent magnets and N-pole permanent magnets arranged such that a corner of each of the N-pole permanent magnets contacts a corner of a respective one of the S-pole permanent magnets on a surface of a stator frame installed facing the armature coil part of the mover, and inserted permanent magnets arranged at spaces formed where the corners of the S-pole permanent magnets contact the corners of N-pole permanent magnets.

2. The planar motor according to claim 1, wherein the S-pole permanent magnets, the N-pole permanent magnets and the inserted permanent magnets of the first permanent magnet part are polarized isotropically.

3. The planar motor according to claim 1, wherein the S-pole permanent magnets and the N-pole permanent magnets of the first permanent magnet part are arranged such that one corner of each of the S-pole permanent magnets contacts a corner of a respective one of the N-pole permanent magnets.

4. The planar motor according to claim 1, wherein the inserted permanent magnet of the first permanent magnet part is diagonally divided into four sections.

5. The planar motor according to claim 1, wherein the inserted permanent magnet of the first permanent magnet part is horizontally and vertically divided into four sections.

6. A planar motor movable in the X-Y direction on a plane, comprising:
   a mover having an armature coil part installed at the bottom of an armature frame, for receiving an electric signal; and a stator with a first permanent magnet part installed having S-pole permanent magnets and N-pole permanent magnets formed on a surface of a stator frame installed facing the armature coil part of the mover, the S-pole permanent magnets being arranged to be inclined at a predetermined angle and the N-pole permanent magnets being arranged in a manner such that one side of each of the N-pole permanent magnets faces a side of a respective one of the S-pole permanent magnets at an interval spaced apart as large as the respective S-pole permanent magnets and first inserted permanent magnets arranged in spaces between the S-pole permanent magnets and the N-pole permanent magnets.

7. The planar motor according to claim 6, wherein the N-pole permanent magnets are arranged to be inclined at a predetermined angle on the surface of the stator frame and the S-pole permanent magnets are arranged in a manner that one side thereof faces the N-pole permanent magnet at an interval spaced apart as large as the N-pole permanent magnet.

8. The planar motor according to claim 6, wherein second inserted permanent magnets are arranged in spaces formed between the first inserted permanent magnets.

9. The planar motor according to claim 8, wherein the S-pole permanent magnets, the N-pole permanent magnets, the first inserted permanent magnets and the second inserted permanent magnets are polarized isotropically.

10. The planar motor according to claim 8, wherein the second inserted permanent magnets are each divided into two sections.

11. A planar motor movable in an X-Y direction in a plane, comprising:
a mover having an armature coil part installed on an armature frame; and
a stator that includes a permanent magnet part comprising:
a plurality of S-pole permanent magnets;
a plurality of N-pole permanent magnets, wherein at least two corners of each of the plurality of S-pole permanent magnets each contacts a corner of a respective one of the plurality of N-pole permanent magnets and at least two corners of each of the N-pole permanent magnets each contacts a corner of a respective one of the plurality of S-pole permanent magnets; and
a plurality of inserted permanent magnets positioned in spaces formed where the corners of the plurality of S-pole permanent magnets and N-pole permanent magnets contact.

12. The planar motor according to claim 11, wherein the plurality of S-pole permanent magnets, the plurality of N-pole permanent magnets, and the plurality of inserted permanent magnets are polarized isotropically.

13. The planar motor according to claim 11, wherein each of the plurality of inserted permanent magnets is divided into four sections.

14. The planar motor according to claim 11, wherein each of the plurality of inserted permanent magnets is diagonally divided into four sections.

15. The planar motor according to claim 11, wherein each of the plurality of inserted permanent magnets is horizontally and vertically divided into four sections.

16. A planar motor movable in an X-Y direction in a plane, comprising:
a mover having an armature coil part installed on an armature frame; and
a stator that includes a permanent magnet part comprising:
a plurality of S-pole permanent magnets;
a plurality of N-pole permanent magnets, wherein the plurality of S-pole permanent magnets and the plurality of N-pole permanent magnets are positioned on a surface of a stator frame facing the armature coil part of the mover, are alternately provided in rows inclined at a predetermined angle with respect to a longitudinal axis of the stator and are spaced apart from one another at intervals equivalent to a size of one of the plurality of S-pole permanent magnets or one of the plurality of N-pole permanent magnets; and
a plurality of inserted permanent magnets arranged in spaces formed between the plurality of S-pole permanent magnets and the plurality of N-pole permanent magnets.

17. The planar motor according to claim 16, wherein the plurality of S-pole permanent magnets, the plurality of N-pole permanent magnets, and the plurality of inserted permanent magnets are polarized isotropically.

18. The planar motor according to claim 16, wherein an S-pole permanent magnet in one row is aligned with and spaced apart from an N-pole permanent magnet in another row, and vise versa.

19. The planar motor according to claim 16, wherein the plurality of inserted permanent magnets are positioned between adjacent S-pole permanent magnets and N-pole permanent magnets.

20. The planar motor according to claim 16, wherein the plurality of N-pole permanent magnets are arranged to be inclined at the predetermined angle on the surface of the stator frame and the S-pole permanent magnets are arranged in a manner that one side thereof of each faces a side of a respective one of the plurality of N-pole permanent magnets and is spaced apart to form an interval equivalent to a size of one of the plurality of N-pole permanent magnets or one of the plurality of S-pole permanent magnets.

21. The planar motor according to claim 16, wherein a plurality of second inserted permanent magnets are arranged in each of the intervals formed where corners of the plurality of first inserted permanent magnets contact one another.

22. The planar motor according to claim 21, wherein the plurality of second inserted permanent magnets are each divided into two sections.

23. The planar motor according to claim 21, wherein the plurality of S-pole permanent magnets, the plurality of N-pole permanent magnets, the plurality of first inserted permanent magnets and the plurality of second inserted permanent magnets are polarized isotropically.

* * * * *